United States Patent
Liu et al.

(10) Patent No.: US 8,268,039 B2
(45) Date of Patent: Sep. 18, 2012

(54) PROCESS FOR ATMOSPHERIC LEACHING OF LATERITE ORES USING HYPERSALINE LEACH SOLUTION

(75) Inventors: Houyuan Liu, Henderson, NV (US); Graham Andrew Reynolds, New South Wales (AU)

(73) Assignee: BHP Billiton SSM Development Pty Ltd., Perth (AU)

( * ) Notice: Subject to any disclaimer, the term of this patent is extended or adjusted under 35 U.S.C. 154(b) by 92 days.

(21) Appl. No.: 12/920,546

(22) PCT Filed: Mar. 19, 2009

(86) PCT No.: PCT/AU2009/000318
§ 371 (c)(1),
(2), (4) Date: Nov. 2, 2010

(87) PCT Pub. No.: WO2009/114904
PCT Pub. Date: Sep. 24, 2009

(65) Prior Publication Data
US 2011/0056333 A1 Mar. 10, 2011

(30) Foreign Application Priority Data
Mar. 19, 2008 (AU) ................................ 2008901351

(51) Int. Cl.
*C22B 3/08* (2006.01)
*C22B 3/12* (2006.01)
(52) U.S. Cl. ...................... 75/743; 423/150.1; 241/24.1
(58) Field of Classification Search .................... 75/743; 241/24.1; 423/150.1
See application file for complete search history.

(56) References Cited

U.S. PATENT DOCUMENTS

| | | | |
|---|---|---|---|
| 6,261,527 B1 | 7/2001 | Arroyo et al. | |
| 6,569,391 B1 | 5/2003 | Arias | |
| 6,680,035 B2 * | 1/2004 | Arroyo et al. | ................. 423/140 |
| 2004/0228783 A1 | 11/2004 | Harris et al. | |
| 2005/0226797 A1 | 10/2005 | Liu et al. | |

FOREIGN PATENT DOCUMENTS

| | | |
|---|---|---|
| AU | 2005100146 | 3/2005 |
| EP | 1 731 623 | 12/2006 |
| WO | WO 02/22897 | 3/2002 |
| WO | WO 2007/035978 | 4/2007 |
| WO | WO 2007/039663 | 4/2007 |

OTHER PUBLICATIONS

"Sea Water" National Weather Service. < http://www.srh.noaa.gov/jetsream/ocean/seawater.htm>. Downloaded Mar. 20, 2012. Page last modified Jan. 5, 2010.*
"seawater." Encyclopdia Britannica. Encyclopædia Britannica Online Academic Edition. Encyclopædia Britannica Inc., 2012. Web. Mar. 21, 2012. <http://www.britannica.com/EBchecked/topic/531121/seawater>.*
U.S. Appl. No. 11/933,804 non-final rejection dated May 29, 2012 (10 pages).

* cited by examiner

*Primary Examiner* — George Wyszomierski
*Assistant Examiner* — Tima M McGuthry Banks
(74) *Attorney, Agent, or Firm* — Brinks Hofer Gilson & Lione; G. Peter Nichols

(57) ABSTRACT

An atmospheric leaching process for the recovery of a nickel and cobalt from a lateritic ore includes (a) preparing a slurry of the lateritic ore with saline or hypersaline water having a total dissolved solids (TDS) content greater than 30 g/L; (b) leaching the slurry of the lateritic ore with sulfuric acid at atmospheric pressure, and (c) recovering nickel and cobalt from the resultant leachate.

17 Claims, 1 Drawing Sheet

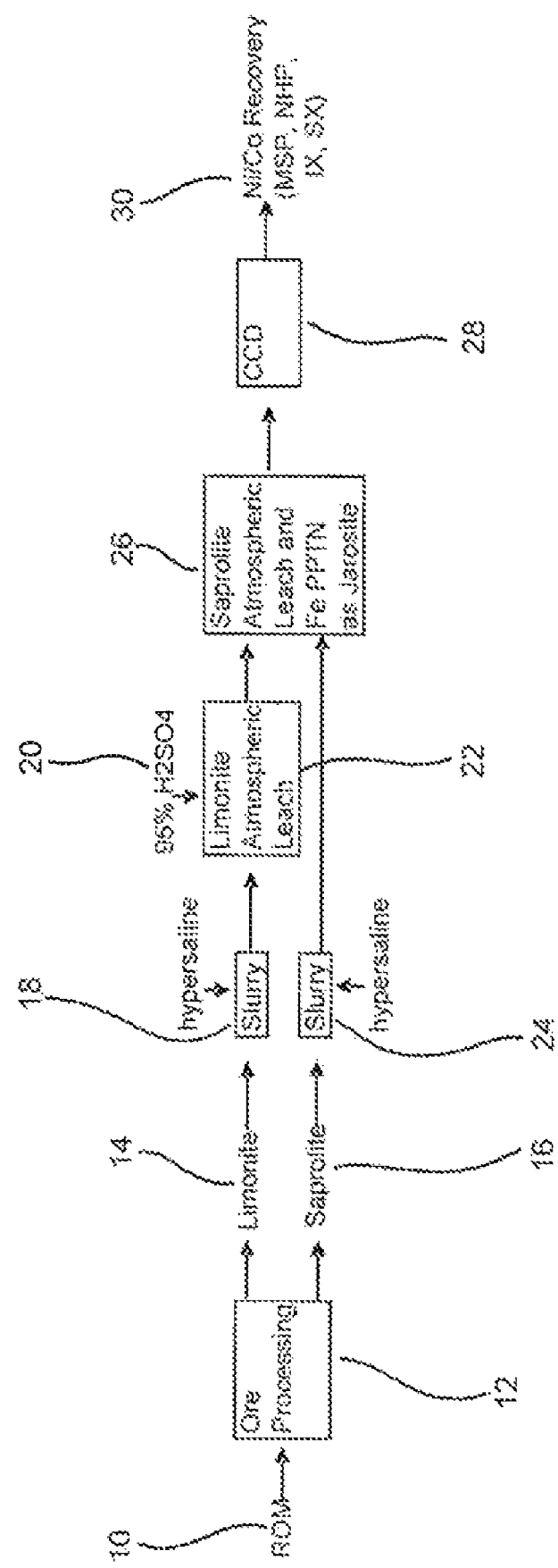

PROCESS FOR ATMOSPHERIC LEACHING OF LATERITE ORES USING HYPERSALINE LEACH SOLUTION

This application claims priority to PCT Application Serial No. PCT/AU2009/000318 filed Mar. 19, 2009 published in English on Sep. 24, 2009 as PCT WO 2009/114904 and to Australian Application No. 2008/901351 filed Mar. 19, 2008, the entire contents of each are incorporated herein by reference.

FIELD OF THE INVENTION

In general, the present invention relates to a new hydrometallurgical method of leaching nickeliferous laterite type ores, to recover nickel and cobalt values. In particular, the present invention provides a method of extraction of nickel and cobalt from nickel and cobalt containing laterite ores by atmospheric leaching of the ore with a leach solution prepared from saline or hypersaline water. The process is particularly suited to laterite ore deposits in arid areas, where subterranean brines are the only economic water source. The process is also applicable for use with the hypersaline effluent from desalination plants.

BACKGROUND OF THE INVENTION

A nickeliferous laterite ore body generally consists of a limonite upper layer and a saprolite lower layer. The term "limonite" refers to the high iron (at least 25 wt. % Fe) and low magnesium (0.5 to 6 wt. % Mg) fraction contained within nickeliferous laterite ores. Similarly, the term "saprolite" denotes the low iron (5-20 wt % Fe) and high magnesium (at least 8 wt. % Mg) fraction contained within nickeliferous laterite ores.

The higher nickel content saprolites tend to be commercially treated by a pyrometallurgical process involving roasting and electrical smelting techniques to produce ferro nickel. The power requirements and high iron to nickel ore ratio for the lower nickel content limonite and limonite/saprolite blends make this processing route too expensive, and these ores are normally commercially treated by a hydrometallurgical process such as the High Pressure Acid Leach (HPAL) process or combination of pyrometallurgical and hydrometallurgical processes such as the Caron reduction roast—ammonium carbonate leach process.

Other hydrometallurgical acid leaching techniques have been developed to exploit nickeliferous oxidic ore in the past decade apart from conventional high pressure acid leach (HPAL). For example enhanced pressure acid leach (EPAL) is described in U.S. Pat. No. 6,379,636 and WO 2006/084335 in the name of BHP Billiton. Atmospheric agitation leaching with iron precipitation as jarosite is described in U.S. Pat. No. 6,261,527 also in the name of BHP Billiton, and atmospheric agitation leaching with iron precipitation as goethite is described in Australian application 2003209829 in the name of QNI Technology. A process for direct atmospheric leaching of the saprolite component is described in U.S. Pat. No. 6,379,637 in the name of Curlook.

Atmospheric acid leaching has been found to be an efficient and economical method to leach both limonite and saprolite components in a single process at atmospheric pressure, while avoiding high capital costs associated with sophisticated autoclaves needed for higher pressure leaching.

Hydrometallurgical processes, by their nature, require large quantities of water. In many areas of the world where nickeliferous oxidic ore deposits occur, good quality water is in short supply, and a costly resource. In the arid regions of Australia for example, only hypersaline underground water or sea water is available in significant quantities. Moreover, at some coastal or island deposits, such as some laterite deposits in Western Australia, desalination plants produce a hypersaline by product stream from sea water or other brines. This stream is used in various processes throughout the operation including in the beneficiation plant and the flocculation plant.

Hypersaline water has been used in the high pressure acid leach (HPAL) process in two plants in Australia, but with reported penalties in terms of lower nickel recovery, increased acid use, and higher capital and maintenance cost of leaching equipment because of the complex metallurgy required to withstand the high chloride solution conditions. It would accordingly be desirable to provide an atmospheric leach process for treating laterites which utilised hypersaline leach liquor.

The above discussion of documents, articles and the like is included in the specification solely for the purpose of providing a context for the present invention. It is not suggested or represented that any or all of these matters formed part of the prior art base or were common general knowledge in the field relevant to the present invention as it existed in Australia before the priority date.

The present invention aims to overcome or at least alleviate one or more of the difficulties associated with the prior art.

SUMMARY OF THE INVENTION

It has been surprisingly found that a leach solution including acid supplemented saline and/or hypersaline water can be satisfactorily used for atmospheric leaching of nickeliferous oxidic ores, in particular laterites, for recovery of nickel and cobalt. This means that atmospheric leaching, which requires very low capital cost equipment and suffers few of the complex metallurgical materials problems of the alternative high pressure acid leach processes, is a low cost alternative for processing nickeliferous oxidic ores, where hypersaline and/or saline waters other than seawater are the available waters.

According to a first aspect of the present invention, there is provided an atmospheric leaching process for the recovery of nickel and cobalt from a lateritic ore, said process including the steps:

(a) preparing a slurry of the lateritic ore with saline or hypersaline water having a total dissolved solids content greater than 30 g/L;

(b) leaching the slurry of the lateritic ore with sulfuric acid, (c) recovering nickel and cobalt from the resultant leachate.

The process of the first aspect of the invention is used to leach lateritic ore which may be separated by either classification or selective mining into low and high magnesium fractions, or may be simply run of mine ore. The process may be used to leach one or both of the low and high magnesium fractions. When the process is used to leach both fractions, these fractions may be leached sequentially, jointly, or in parallel.

According to a second aspect of the present invention, there is provided an atmospheric leaching process for the recovery of nickel and cobalt from a lateritic ore containing low and high magnesium fractions, the process including the steps of:

(a) separating the lateritic oxidic ore into a low magnesium containing ore fraction and a high magnesium containing ore fraction;

(b) preparing respective slurries of the low magnesium ore fraction and the high magnesium ore fraction with saline or hypersaline water having a total dissolved solids content greater than 30 g/L;

(c) in a primary leach step, leaching the slurry of the low magnesium ore fraction with sulfuric acid;

(d) introducing the slurry of the high magnesium containing ore fraction following substantial completion of the primary leach step and precipitating iron as jarosite.;

(e) recovering nickel and cobalt from the resultant leachate.

As used herein, the term "jarosite" means a solid having the general formula: $MFe_3(SO_4)_2(OH)_6$, where "M" may be Na, K, H or $NH_4$. Typically M is Na or K, more typically it is Na ("natrojarosite").

Hypersaline waters useful in the process of the invention are generally sourced from surface and/or underground brines, or in some circumstances concentrated seawater or the rejection effluent from desalination processes, which contains a higher concentration of total dissolved solids (TDS) than seawater. Typically water sourced from brines will have a salinity or TDS higher than that of seawater and it has surprisingly been found that hypersaline waters with a TDS concentration well in excess of that of seawater provide higher iron precipitation efficiency and improved nickel and cobalt recovery in atmospheric processes. Preferred concentrations of the hypersaline waters that are useful in the process have a TDS concentration of from 40-200 g/L, more preferably from 50 to 150 g/L.

The inventors of the process have also found that saline or hypersaline waters sourced from salinated water bodies other than seawater are useful in the process of the invention. Accordingly, in a third aspect, the present invention provides an atmospheric leaching process for the recovery of nickel and cobalt from a lateritic ore, said process including the step of:

(a) preparing a slurry of the lateritic ore with saline or hypersaline water sourced from surface and/or underground brine having a total solids content greater than 5 g/L;

(b) leaching the slurry with a sulfuric acid, and (c) recovery nickel and cobalt from the resultant leachate The process of the third aspect of the invention is used to leach lateritic ore which may be separated into low and high magnesium fractions, or may be simply run of mine ore. The process may be used to leach one or both of the low and high magnesium fractions. When the process is used to leach both fractions, these fractions may be leached sequentially, jointly, or in parallel.

In a fourth aspect, the present invention provides a process for the recovery of nickel and cobalt from a lateritic ore by atmospheric leaching, the process including the steps of:

a) separating the lateritic ore into a low magnesium containing ore fraction and a high magnesium containing ore fraction;

b) preparing respective slurries of the low magnesium ore fraction and the high magnesium ore fraction with saline or hypersaline water sourced from surface and/or underground brine having a total solids content greater than 5 g/L;

c) in a primary leach step leaching the slurry of the low magnesium ore fraction with a sulfuric acid;

d) introducing the slurry of the high magnesium containing ore fraction following substantial completion of the primary leach step and precipitating iron as a jarosite;

e) recovering nickel and cobalt from the resultant leachate.

The term "surface and/or underground brine" as used herein includes salinated waters found inland and excludes seawater. Generally brine will be found in underground or subterranean sources, particularly in arid regions, but may also be found in salinated inland lakes, rivers or creeks. The TDS concentration found in brines useful in the process of the invention described herein will be at least 5 g/L. The salinity of water sourced from brines may however be variable, lower or higher than that of seawater and could range from a TDS concentration of from 5-200 g/L.

Predominantly, the dominant dissolved solids found in both saline or hypersaline water from surface and underground brine sources, and indeed in seawater, is sodium chloride, but other salts such as magnesium chloride and potassium chloride are usually found in minor concentrations. Waters having a chloride ion concentration of at least 17 g/L are preferred in the process of the invention. More preferably, a chloride ion concentration of from 24 to 120 g/L has been found to be useful in the process of the invention, with a concentration of from 30 g/L to 90 g/L being most preferred.

Generally, seawater has a total solids concentration of less than 30 g/L, of which about 27 g/L will be sodium chloride salts with a chloride ion concentration of about 16.4 g/L. Consequently the rejection effluent of a desalination plant contains a higher solid concentration and chloride ion concentration than that of seawater. The term "hypersaline" as used herein and in the claims denotes water having a salinity greater than seawater, that is a water having a TDS content of greater than 30 g/L and/or a chloride ion concentration of at least 17 g/L.

The use of sulfuric acid fortified seawater, having a typical sodium chloride concentration of 27 g/L is disclosed as a leach solution for atmospheric leaching of lateritic ore in U.S. Pat. No. 6,261,527 (BHP Minerals International Inc). The inventors of the present invention have found that this process can be improved upon, or made more commercially practical, by using saline and/or hypersaline water with salinity greater than that of seawater, or from sources other than seawater, to provide improved iron precipitation efficiency as jarosite due to higher sodium concentration provided and nickel or cobalt recovery. In one embodiment, the process disclosed herein utilises seawater in processes where the relative salinity (i.e the ratio of salinity of the saline and/or hypersaline water to that of seawater) is greater than 1, corresponding a TDS concentration of greater than 30 g/L. For example the seawater may either have been concentrated or combined with other hypersaline waters such as those from surface or underground brines, to form the hypersaline solution. In yet another embodiment, the rejection effluent from desalination plants which use seawater or other saline or brackish waters as feed water may be used. Desalination plants are commonly used in arid regions, and in coastal areas where fresh water is in short supply to provide a source of fresh water. Such rejection effluents have high salinity, generally with a TDS content in the range of from 40 to 200 g/L, and could readily be redirected for use in the leach solution in an atmospheric leach process.

While it is preferred that saline and/or hypersaline water is used exclusively to slurry the laterite ore, there may be some environments where there is insufficient saline and/or hypersaline water to treat all of the ore, and in such situations, other types of water (eg fresh or seawater) may be required to supplement the process. For example, the hypersaline and/or saline water may be used to slurry one fraction of the laterite ore, and another type of water used to slurry the other fraction.

The process is particularly suited to laterite deposits in arid areas, where subterranean brines are the only economic water source, or on island or coastal laterite deposits where only seawater is available. Desalination plants are often associated with such sites, as a source of freshwater, and the effluent from desalination plants could also be used as a source of hypersaline water.

DETAILED DESCRIPTION OF THE INVENTION

Accordingly, the present invention provides an atmospheric leaching process to effect the dissolution of nickel and cobalt from nickeliferous laterite ores containing low and high magnesium (such as limonite and saprolite) fractions. As previously noted, the term limonite refers to the high iron (at least 25 wt. % Fe) and low magnesium (0.5 to 6 wt. % Mg) fraction contained within nickeliferous laterite ores. Similarly, the term saprolite denotes the low iron (5-20 wt % Fe) and high magnesium (at least 8 wt. % Mg) fraction contained within nickeliferous laterite ores. It should be stressed that these composition ranges are in no way limiting, but represent ranges more advantageously used in this process.

The process of the invention is used to leach lateritic ore which may be separated by either classification or selective mining into low and high magnesium fractions, or may be simply run of mine ore. The process may be used to leach one or both of the low and high magnesium fractions. When the process is used to leach both fractions, these fractions may be leached sequentially, jointly, or in parallel.

The lateritic ore is slurried with hypersaline and/or saline water. It is then leached with sulfuric acid, and nickel and cobalt are recovered from the resultant leachate Preferably, the lateritic ore is first separated into limonite and saprolite ore fractions. For example, the ores may be classified by pulping and screening, or mined selectively to end up with two distinctive ore fractions. The fractions are respectively slurried with hypersaline and/or saline water.

Preferably, the solids concentration in the limonite slurry is between 20 and 50 wt %, more preferably around 20 wt %.

The limonite slurry is then preferably contacted with sulfuric acid at a temperature below the boiling point of the slurry and at atmospheric pressure. The temperature is preferably around 95 to 105° C. The sulfuric acid is concentrated, preferably about 95% $H_2SO_4$. The amount of sulfuric acid is sufficient to dissolve most or all of the iron, nickel, cobalt and magnesium in the limonite ore.

Preferably the redox potential is maintained below 1000-mV versus standard hydrogen electrode ("SHE") and more advantageously above 900 mV by the addition of a reducing agent to enhance cobalt dissolution, while minimising reduction of ferric iron to ferrous iron. Preferably the reducing agent is sulfur dioxide gas or sodium metabisulfite.

After the end of the primary leach stage, the saprolite slurry is preferably introduced. Preferably the concentration of ore in the slurry is from 5 to 50 wt %, more preferably from 5 to 40 wt %. The practical upper limit on solids concentration in the slurry will vary according to slurry rheology and its effect on slurry pumping and agitation. Slurry rheology typically varies with ore types and solution sources. Leaching of the saprolite ore fraction proceeds resulting in precipitation of an iron containing sulfate phase, typically a jarosite. The jarosite precipitation reaction may be described as follows:

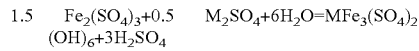

where M is Na, K, H or $NH_4$. Typically M is Na or K, which is derived from the hypersaline water. More typically, the sodium content in the saline and/or hypersaline solution becomes the main source of sodium in the precipitated jarosite. Precipitation of jarosite can be promoted by maintaining the temperature of the slurry at or close to its boiling point and by recycling jarosite crystals as seeds and/or by increasing the concentration ratio of M to $Fe^{+3}$.

In general, the process forms part of an overall process for the recovery of nickel and cobalt. In a preferred process, the leach solution is supplemented by other acid streams in the associated nickel and cobalt recovery process. Preferably, the acid streams that may be used to supplement the leach solution include:
a) the nickel depleted recycled raffinate from a downstream nickel ion exchange step or solvent extraction process; and/or
b) the acidic leachate containing at least nickel, cobalt and iron from a high pressure or an atmospheric pressure acid leach process or heap leach process of laterites, or a combination thereof; and/or
c) the acidic leachate from the oxidative pressure leach or atmospheric pressure leach or heap leach of a nickel sulfide ore or concentrate.

Suitable saline and/or hypersaline water quality will vary depending on the source of the water, and may typically, if sourced from surface or underground brines in arid regions, have a TDS concentration in the range of from 5 g/L to 200 g/L. Preferably however, hypersaline water is used having a TDS concentration of from 40 to 200 g/L. The TDS will be salts, generally comprising sodium chloride, but also other salts such as magnesium chloride or potassium chloride salts in minor concentrations. If sourced from seawater, the water may be concentrated slightly by evaporating off some of the water to prepare hypersaline water or the concentrated effluent from a desalination process may be used. Effluent from desalination plants, which may process seawater and/or other salinated and brackish waters, typically has a TDS concentration of from 40 to 200 g/L.

Most preferably the process of the present invention utilises hypersaline water having a TDS concentration of from 50 to 150 g/L. The inventors have surprisingly found that improved nickel recovery and iron precipitation efficiency may be achieved when acid supplemented hypersaline waters within this range are used in heap leach processes. Preferably, the hypersaline water will have a chloride ion concentration in excess of 17 g/L more preferably from 24 to 120 g/L and most preferably from 30 to 90 g/L. Typical potable water has less than 0.5 g/L TDS.

Recovery of nickel and cobalt from the leachate can be by any suitable means, such as by counter current decantation followed by mixed sulfide precipitation (MSP), nickel hydroxide precipitation (NHP) ion exchange (IX), or other known metallurgical processing routes to extract and separate the nickel and cobalt.

DESCRIPTION OF THE DRAWING

FIG. 1 is a flowsheet of a preferred embodiment of the process of the invention.

Run of mine laterite ore (10) is subjected to an ore processing and classification step (12) which separates the ore into a low magnesium, or limonite, fraction (14) and a high magnesium, or saprolite, fraction (16). The limonite fraction (14) is formed into a slurry (18) with addition of hypersaline water having a TDS content greater than 30 g/L and a chloride ion concentration greater than 17 g/L. The solids concentration in the slurry is from 20 to 50%. Concentrated (95 vol %) sulfuric acid (20) is then added and the limonite slurry is then leached (22) under atmospheric pressure at a temperature below the boiling point of the slurry while maintaining the redox potential between 900 and 1000 mv (SHE) by $SO_2$ injection. Leaching of the limonite slurry is conducted with agitation for a sufficient time to effect significant dissolution of nickel, cobalt, magnesium and iron from the limonite fraction.

The saprolite fraction (16) is also formed into a slurry (24) by addition of hypersaline water The solids concentration in the slurry is from 5-50% wt, preferably about 20% wt. The saprolite slurry (24) is mixed with the leached limonite slurry in a saprolite atmospheric leach stage (26) at a temperature above 85° C., preferably above 95° C., in which iron is precipitated as jarosite and nickel and magnesium are dissolved from saprolite. The mixed leached slurry is then subjected to counter current decantation (28) and the resulting leachate is processed by conventional means to recover Nickel and Cobalt. (30).

EXAMPLE

Laterite ore samples from the BHP Billiton Ravensthorpe Nickel Operations in Western Australia were crushed to an average particle size of approximately $P_{100}$=250 micron and separated into limonite and saprolite fractions. Each fraction was separately slurried with hypersaline water and subjected to atmospheric leaching using a standard operating procedure as described in the following paragraphs.

The atmospheric leach reactor was a three liter glass reaction vessel fixed inside a heating mantle. A titanium "Lightning brand", three—bladed agitator and motor mixed the slurry. The exhaust vapour losses were controlled with a condenser.

Approximately one liter of limonite slurry having a solids concentration of between 32-45% w/w was added to the reaction vessel. This slurry was heated to approximately 60° C. prior to the addition of 98% sulfuric acid. The dilution heat of sulfuric acid increased the reaction temperature to between 95 and 105° C. Limonite was almost completely dissolved, leaving undissolved minerals such as silicates and chromite in the solids phase. A reductant such as sulfur dioxide or sodium metabisulfite was added to control redox potential between 900 and 1000 mv (SHE) and to improve the extraction of cobalt if required.

The limonite slurry was leached for three hours, after which a predetermined amount of the saprolite slurry having a predetermined solids concentration (40-43% w/w) was added to the reaction vessel. The saprolite reacted with the free acid remaining in the limonite leach solution, dissolving more nickel and causing iron to precipitate in the presence of sodium (from the hypersaline water) as natrojarosite. As iron precipitated, more acid was generated, further promoting saprolite leaching.

The temperature of leaching was maintained at between 95 and 105° C. and the combined slurry leached for a further eleven hours or until the iron precipitation and nickel leaching reactions were completed.

At the completion of the saprolite leach, limestone slurry was added to complete the precipitation of any remaining dissolved iron.

Dissolved nickel was then further refined from the final leachate solution through the use of selective precipitation to produce nickel-containing products such as hydroxide or carbonate with high purity.

The operational parameters of the four applicable experiments: 2001-1, 2001-2, 2001-3 and 2006-1 are summarised below in Table 1.

TABLE 1

Operational Parameters for Hypersaline Atmospheric Leach Experiments.

| Experiment | 2001 - 1 | 2001 - 2 | 2001 - 3 | 2006 - 1 |
|---|---|---|---|---|
| Limonite Sample | A8007 Limonite Composite (−71 micron) | | | R44 |
| Saprolite Sample | A8007 Saprolite Composite (−71 micron) | | | R40 |
| Limonite Acid Consumption (kg/t) | 873 | 749 | 708 | 796 |
| Saprolite Acid Consumption (kg/t) | | 730 | | 638 |
| Saprolite:Limonite weight ratio | 0.52 | 0.40 | 0.30 | 0.45 |
| Acid:Ore weight ratio | 0.63 | 0.61 | 0.59 | 0.60 |
| *Initial Salinity of hypersaline water | Relative Salinity: 1.8 to 2.0 28-32 g/L Cl or 46-52 g/L TDS | | | |
| Final Acidity of leachate (g/L) | | 25 | | |
| Final Ferric Iron Conc. of leachate (g/L) | | 5 | | |
| Ore concentration in Limonite slurry. % wt | 35 | 32 | | 45 |
| Ore concentration in Saprolite slurry % wt | | 40 | | 43 |
| Limonite Slurry Mass (g) | 1072 | 1307 | 1438 | 1429 |
| Saprolite Slurry Mass (g) | 512 | 419 | 346 | 673 |
| 98% Sulfuric Acid Mass (g) | 385 | 363 | 362 | 572 |

The results for the extraction of nickel in all experiments and cobalt in Experiments 2001-1, 2001-2 and 2001-3 are shown below in Table 2. The extent of extraction was calculated by determining the nickel and cobalt content of the final residue versus that in the original sample.

TABLE 2

Nickel and Cobalt Extraction.

| | Co extraction % | | | Ni Extraction % | | |
|---|---|---|---|---|---|---|
| No | Limonite | Saprolite | Overall | Limonite | Saprolite | Overall |
| 2001-1 | >95 | >95 | >95 | 96.7 | 80.6 | 90.4 |
| 2001-2 | 90.1 | 84.9 | 88.6 | 89.6 | 83.4 | 87.8 |
| 2001-3 | 88.5 | 88.6 | 88.5 | 85.9 | 91.3 | 87.1 |
| 2006-1 | n.a. | n.a | n.a | 90.5 | 88.7 | 87.8 |

Table 2 shows that overall nickel extraction was greater than 87% in all experiments. Moreover, overall cobalt extraction from Experiments 2001-1 to 2001-3 was greater than 88%. Chemical analyses of the leach residue of all experiments suggested that natrojarosite was the predominant species in the solid phase.

References to prior art in this specification are provided for illustrative purposes only and are not to be taken as an admission that such prior art is part of the common general knowledge in Australia or elsewhere.

Finally, it is to be understood that various other modifications and/or alterations may be made without departing from the spirit of the present invention as outlined herein.

The invention claimed is:

1. An atmospheric leaching process for the recovery of a nickel and cobalt from a lateritic ore, said process including the steps:
    (a) preparing a slurry of the lateritic ore with hypersaline water having a total dissolved solids (TDS) content of from 40 to 200 g/L;
    (b) leaching the slurry of the lateritic ore with a leach solution including sulfuric acid at atmospheric pressure,
    (c) recovering nickel and cobalt from the resultant leachate.

2. A process according to claim 1 wherein the hypersaline water has a TDS concentration of from 50 to 150 g/L.

3. A process according to claim 1 wherein the hypersaline water has a chloride ion concentration in excess of 17 g/L.

4. A process according to claim 3 wherein the hypersaline water has a chloride ion concentration of from 24 to 120 g/L.

5. A process according to claim 4 wherein the hypersaline water has a chloride ion concentration of from 30 to 90 g/L.

6. A process according to claim 1 wherein the hypersaline water is sourced from at least one of surface brine, underground brine, concentrated seawater, and the effluent from a desalination plant.

7. A process according to claim 1, wherein the saline or hypersaline water is supplemented with sulfuric or hydrochloric acid.

8. A process according to claim 1, wherein the sulfuric acid is concentrated.

9. A process according to claim 1, wherein the leach solution is supplemented with one or more acidic streams from sources associated with the nickel and cobalt recovery process.

10. A process according to claim 9 wherein the acidic streams include at least one of:
    a) a nickel depleted recycled raffinate from a downstream nickel ion exchange step or solvent extraction process,
    b) an acidic leachate containing at least nickel, cobalt and iron from a high pressure or an atmospheric pressure acid leach process or heap leach process of nickeliferous oxidic ores, or a combination thereof; and
    c) an acidic leachate from an oxidative pressure leach or atmospheric pressure leach or heap leach of a nickel sulfide ore or concentrate.

11. A process according to claim 1, wherein the nickel and cobalt are recovered from the leachate by precipitation as a sulfide, hydroxide or carbonate, by solvent extraction, or by ion exchange processes.

12. An atmospheric leaching process for the recovery of nickel and cobalt from a lateritic ore containing low and high magnesium fractions, the process including the steps of:
    (a) separating the lateritic ore into a low magnesium containing ore fraction and a high magnesium containing ore fraction;
    (b) preparing respective slurries of the low magnesium ore fraction and the high magnesium ore fraction with hypersaline water having a total dissolved solids (TDS) content of from 40 to 200 q/L;
    (c) in a primary leach step, leaching the slurry of the low magnesium ore fraction with sulfuric acid at atmospheric pressure;
    (d) introducing the slurry of the high magnesium containing ore fraction following substantial completion of the primary leach step and precipitating iron as jarosite;
    (e) recovering nickel and cobalt from the resultant leachate.

13. A process according to claim 12 wherein the low magnesium ore fraction is limonite and the high magnesium ore fraction is saprolite.

14. An atmospheric leaching process for the recovery of nickel and cobalt from a lateritic ore, said process including the steps of:
    (a) preparing a slurry of the lateritic ore with hypersaline water sourced from at least one of surface and underground brine having a total dissolved solids (TDS) content of from 40 to 200 g/L;
    (b) leaching the slurry with a sulfuric acid at atmospheric pressure, and
    (c) recovering nickel and cobalt from the resultant leachate.

15. An atmospheric leaching process for the recovery of nickel and cobalt from a lateritic ore, the process including the steps of:
    (a) separating the lateritic ore into a low magnesium containing ore fraction and a high magnesium containing ore fraction;
    (b) preparing respective slurries of the low magnesium ore fraction and the high magnesium ore fraction with hypersaline water sourced from at least one of surface and underground brine having a total dissolved solids (TDS) content of from 40 to 200 g/L;
    (c) in a primary leach step leaching the slurry of the low magnesium ore fraction with a sulfuric acid at atmospheric pressure;
    (d) introducing the slurry of the high magnesium containing ore fraction following substantial completion of the primary leach step and precipitating iron as a jarosite;
    (e) recovering nickel and cobalt from the resultant leachate.

16. An atmospheric leaching process for the recovery of a nickel and cobalt from a lateritic ore, said process including the steps:
    (a) preparing a slurry of the lateritic ore with saline or hypersaline water having a total dissolved solids (TDS) content greater than 30 g/L and supplemented with sulfuric or hydrochloric acid;
    (b) leaching the slurry of the lateritic ore with a leach solution including sulfuric acid at atmospheric pressure,
    (c) recovering nickel and cobalt from the resultant leachate.

17. An atmospheric leaching process for the recovery of nickel and cobalt from a lateritic ore, said process including the steps of:
    (a) preparing a slurry of the lateritic ore with saline or hypersaline water sourced from at least one of surface and underground brine having a total dissolved solids (TDS) content greater than 5 g/L and supplemented with sulfuric or hydrochloric acid;
    (b) leaching the slurry with a sulfuric acid at atmospheric pressure, and
    (c) recovering nickel and cobalt from the resultant leachate.

* * * * *